United States Patent [19]

Moden et al.

[11] 4,107,406
[45] Aug. 15, 1978

[54] ALUMINUM ALLOY FOR PRIMARY ALKALINE FUEL CELLS AND BATTERIES

[75] Inventors: James R. Moden, Barrington; George Perkons, Newport, both of R.I.

[73] Assignee: The United States of America as represented by the Secretary of the Navy, Washington, D.C.

[21] Appl. No.: 809,599

[22] Filed: Jun. 24, 1977

[51] Int. Cl.² ............................................. H01M 4/58
[52] U.S. Cl. .................................... 429/218; 75/147; 204/293
[58] Field of Search ...................... 429/218, 119, 245; 75/147, 138; 204/293, 148

[56] References Cited

U.S. PATENT DOCUMENTS

| | | |
|---|---|---|
| 3,189,486 | 6/1965 | Pryor et al. .................... 429/119 X |
| 3,240,688 | 3/1966 | Pryor et al. .................... 429/218 X |
| 3,317,350 | 5/1967 | Murphy .............................. 429/119 |
| 3,379,636 | 4/1968 | Reding et al. .................... 75/138 X |
| 3,393,138 | 7/1968 | Hine ................................ 75/138 X |
| 3,513,031 | 5/1970 | Zaromb ............................... 429/29 |

Primary Examiner—Charles F. LeFevour
Attorney, Agent, or Firm—Richard S. Sciascia; Arthur A. McGill; Prithvi C. Lall

[57] ABSTRACT

A tin and mercury free aluminum alloy of specific composition for use as an anode in fuel cells and electrochemical couples and particularly in a silver oxide-aluminum battery comprising high purity aluminum alloyed with gallium and magnesium in specified quantities. The aluminum in combination with the gallium provide desired unique electrochemical properties. The magnesium, when the anode material is suitably heat treated, increases the tensile modulus of the alloy.

4 Claims, 1 Drawing Figure

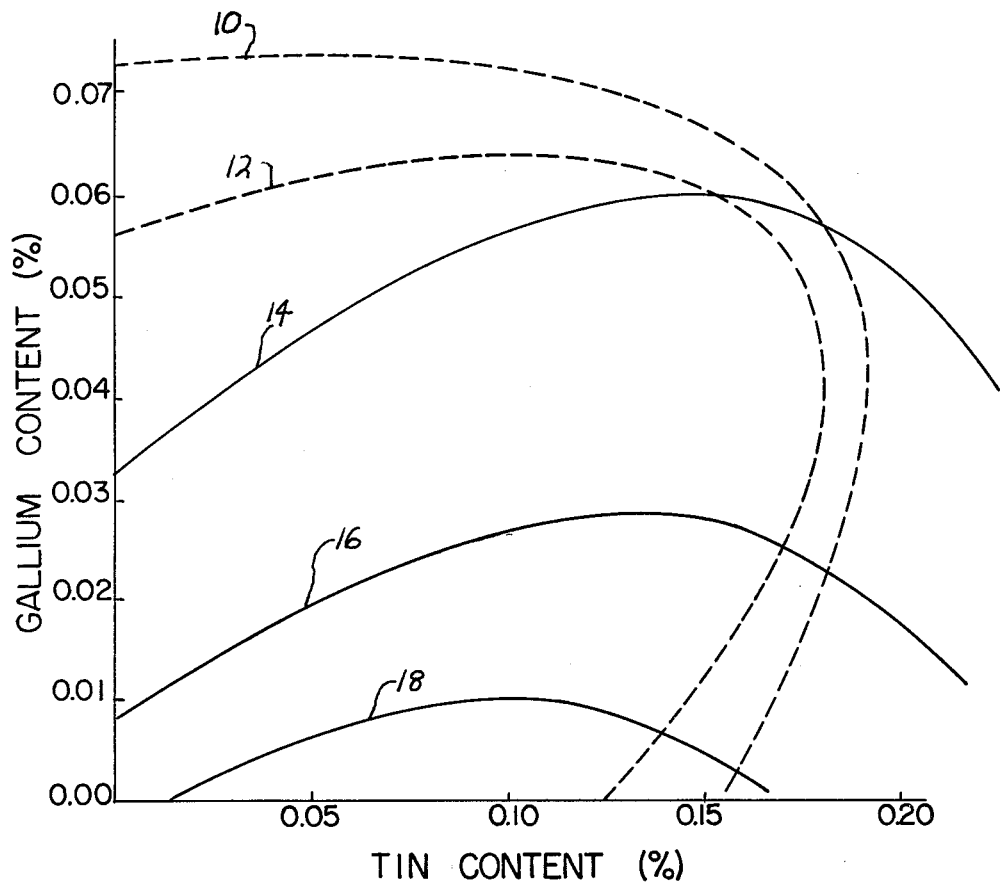

ALUMINUM ALLOY FOR PRIMARY ALKALINE FUEL CELLS AND BATTERIES

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention generally relates to anodes in electrochemical cells using strong alkaline solutions and/or seawater as electrolytes and more particularly to an aluminum alloy anode having high energy, high electrochemical potential and low gassing rates in these cells.

The majority of previous aluminum alloys contain, most importantly, fractional percentages of tin, gallium, mercury and magnesium. Graphical analysis of recent data led to the inventors predicting significant improvement to the desired properties of high potential and low gassing by producing an aluminum alloyed with only gallium for high potential and low gassing, and magnesium to control tensile modulus. The exclusion of tin as an alloying ingredient appears to raise the potential and lower the gassing rate as compared to similar alloys containing tin in the range of 0.05 to 0.34 percent.

Another prior alloy contains aluminum, mercury and various other elements. Mercury, although well known for its ability to raise the hydrogen overvoltage of other metals, is quite toxic under certain conditions. The U.S. Navy is spending large sums of money to eliminate the use of mercury in many batteries.

SUMMARY OF THE INVENTION

It is therefore a general object of the present invention to provide an improved anode suitable for electrolytic cells. It is an additional object to provide an improved anode material for a silver oxide-aluminum battery. Further objects are that the anode be suitable for high electrochemical potential and have a low gassing rate. These and other objects of the invention and the various features and details of construction and operation will become apparent from the specification.

The above objects are obtained by providing an aluminum base alloy with specific amounts of gallium and magnesium. The addition of gallium at a preferred level provides an anode suitable for producing a high electrochemical potential with reduced gassing. The addition of magnesium at a preferred level increases the tensile modulus when suitably heat treated. When the alloy is rolled and annealed, it is uniquely suited by virtue of its high potential and low gassing rate as an anode in primary alkaline batteries and fuel cells.

BRIEF DESCRIPTION OF THE DRAWING

The FIGURE depicts the changes in volts/cell and gas generation in CC $H_2/CM^2/MIN$ as a function of changes in tin and gallium content.

DESCRIPTION OF THE PREFRERRED EMBODIMENTS

In accordance with the present invention, there is provided a FIGURE that shows an anode that is alloyed from aluminum having an initial high purity of 99.997 percent. Magnesium varying from 0.5 to 1.2 percent as an additive is also included in the anode. The FIGURE is a graph drawn after measuring a plurality of samples showing the effect of gallium and tin content as additional alloying ingredients used in the anode.

Curve 10 of the FIGURE shows the amounts of tin and gallium content resulting in corrosion producing gas at the rate of 0.1 CC $H_2/CM^2/MIN$. Curve 12 shows reduced gas generation of only 0.05 CC $H_2/CM^2/MIN$. Curves 14, 16 and 18 show cell potentials of 1.70, 1.65 and 1.60 volts/cell under load. All measurements were taken using the test setup explained in Example 1.

EXAMPLE 1

In all cell tests for forming the FIGURE the same test setup was used. The current output of the battery was measured across a low impedance shunt resistor. The current density was 3 amps/in$^2$ (0.47 amps $CM^2$). The full cell voltage variance was measured. The anode and cathode half cell voltages were measured to characterize and two electrodes. The temperature of the electrolyte was held constant throughout the test at 150° F (65.6° C). All tests were conducted with a 25 percent KOH solution prepared with synthetic seawater made to standard with ASTM sea salt to which 20 gm/liter of sodium stannate was added. The alloy compositions of both gallium and tin were varied in the anode. The remaining elements consisted of super high purity aluminum having an initial purity of 99.997 percent and a varying amount of magnesium. The magnesium was varied from 0.5 to 1.2 percent. This is not shown in the graph as no detectable changes in electrochemical measurement were noticed over this range. The only value of the magnesium is for strength characteristics.

EXAMPLE 2

Using the test setup of Example 1, an alloy consisting essentially of aluminum that was initially 99.997 percent pure, 0.04 percent gallium and 0.74 percent magnesium was used. A cell voltage of 1.71 volts/cell was obtained. This concurs with the expected results of the FIGURE.

It is shown in the FIGURE that as the amount of tin is reduced to zero, less gallium content is necessary to maintain an equivalent voltage per cell. For example, to maintain 1.65 volts/cell with 0.14 percent tin, a quantity of 0.03 percent gallium is necessary. If the alloy contains no tin, then only approximately 0.01 percent gallium content is necessary. The results obtained at 1.60 volts/cell and 1.70 volts/cell also show the negative effect on performance produced by tin.

Another adverse effect of tin is shown in the FIGURE on the gassing rate of anodes where 0.05 CC $H_2/CM^2/MIN$ is produced with a 0.15 percent tin and 0.06 percent gallium at 1.70 volts/cell. If the amount of tin is reduced or eliminated, less gallium is required to maintain 1.70 volts/cell and the $H_2$ gassing rate is reduced. Slightly increasing the tin content above the 0.15 percent level at all concentrations of gallium results in an unacceptable level of gassing.

There has, therefore, been described appropriate alloys for the anodes in high power density, potassium hydroxide enhanced, seawater cells. One can also notice, with the aid of the FIGURE, inappropriate combinations of alloys in which poor performance is obtained. The FIGURE aids in giving a far better understanding of performance than has heretofore been available using isolated examples to explain results obtained from various combinations of materials. The FIGURE shows adequate performance with a tin content from 0 to 0.19 percent by weight and a gallium content of 0.001 to 0.072 percent by weight. However, improved performance was obtained when tin was eliminated. A range of superior performance was attained when the gallium content was between 0.02 and 0.06 percent by weight and no tin was used.

What is claimed is:

1. An anode for a primary electrochemical energy source consisting essentially of 0.001 to 0.072 percent by weight of gallium, 0.5 to 1.2 percent by weight of magnesium and the balance of aluminum having an initial purity of at least 99.997 percent.

2. An anode for a primary electrochemcial energy source consisting essentially of 0.001 to 0.072 percent by weight of gallium, 0.5 to 1.2 percent by weight of magnesium and the balance of aluminum having incidental impurities.

3. An anode for a primary electrochemcial energy source consisting essentially of 0.02 to 0.06 percent by weight of gallium 0.5 to 1.2 percent by weight of magnesium and the balance of aluminum having an initial purity of at least 99.997 percent.

4. An anode for a primary electrochemical energy source consisting essentially of 0.02 to 0.06 percent by weight of gallium, 0.5 to 1.2 percent by weight of magnesium and the balance of aluminum having incidental impurities.

* * * * *